US009781295B2

(12) United States Patent
Kawano

(10) Patent No.: US 9,781,295 B2
(45) Date of Patent: Oct. 3, 2017

(54) IMAGE PROCESSING APPARATUS, A METHOD FOR PERFORMING SPECIFIC PROCESS ON AN IMAGE PROCESSING APPARATUS, AND A COMPUTER-READABLE STORAGE MEDIUM FOR A PROGRAM TO BE EXECUTED BY AN IMAGE PROCESSING APPARATUS

(71) Applicant: Konica Minolta, Inc., Tokyo (JP)

(72) Inventor: Tatsuya Kawano, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/928,006

(22) Filed: Oct. 30, 2015

(65) Prior Publication Data

US 2016/0127604 A1     May 5, 2016

(30) Foreign Application Priority Data

Oct. 31, 2014  (JP) ................. 2014-222178

(51) Int. Cl.
H04N 1/32       (2006.01)
H04N 1/04       (2006.01)
(Continued)

(52) U.S. Cl.
CPC ....... *H04N 1/32475* (2013.01); *G06F 9/5044* (2013.01); *G06K 15/1848* (2013.01);
(Continued)

(58) Field of Classification Search
None
See application file for complete search history.

(56) References Cited

U.S. PATENT DOCUMENTS

2004/0187126 A1*  9/2004  Yoshimura ............ G06F 9/5038
                                              718/100
2011/0102835 A1*  5/2011  Tokumoto ............. G06F 3/1211
                                              358/1.15

FOREIGN PATENT DOCUMENTS

JP    2007-105917 A    4/2007
JP    2009-054001 A    3/2009
(Continued)

OTHER PUBLICATIONS

Extended European Search Report in counterpart European Patent Application No. 15188537.3, dated Apr. 15, 2016 (9 pages).
(Continued)

*Primary Examiner* — Andrew H Lam
(74) *Attorney, Agent, or Firm* — Osha Liang LLP

(57) ABSTRACT

An image processing apparatus includes a processor having a plurality of cores, each having different specifications. The image processing apparatus further includes a first estimator that estimates a processing capability of each of the plurality of cores, a second estimator that estimates, based on the processing capability of each of the plurality of cores, a required time for each of the plurality of cores to perform a specific process, and a controller. The plurality of cores comprises one or more candidate cores. The required time for each of the one or more candidate cores is equal to or less than a threshold. The controller controls one of the one or more candidate cores to perform the specific process. The required time of the candidate core that performs the specific process is the longest among the one or more candidate cores.

8 Claims, 7 Drawing Sheets

(51) Int. Cl.
*G06K 15/02* (2006.01)
*G06F 9/50* (2006.01)

(52) U.S. Cl.
CPC .......... *H04N 1/04* (2013.01); *H04N 1/32561* (2013.01); *H04N 2201/0094* (2013.01)

(56) References Cited

FOREIGN PATENT DOCUMENTS

| | | |
|---|---|---|
| JP | 2009-230220 A | 10/2009 |
| JP | 2010-160715 A | 7/2010 |
| JP | 2012071544 A | 4/2012 |
| JP | 2012-147211 A | 8/2012 |

OTHER PUBLICATIONS

Office Action issued in corresponding Japanese Application No. 2014-222178 dated Dec. 27, 2016, and English translation thereof (8 pages).

Office Action in counterpart Japanese Patent Application No. 2014-222178 dated Jul. 4, 2017 (10 pages).

\* cited by examiner

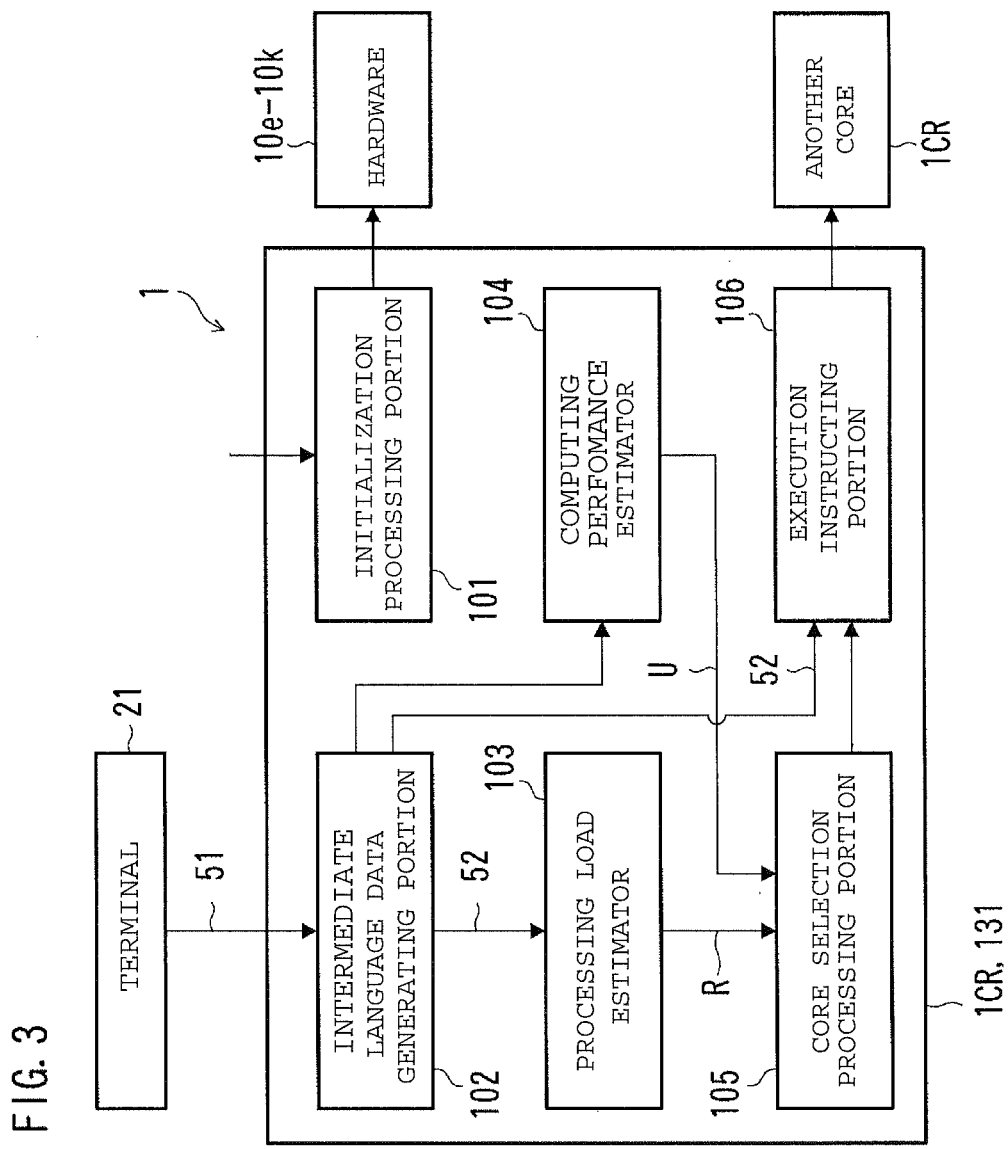

IMAGE PROCESSING APPARATUS, A METHOD FOR PERFORMING SPECIFIC PROCESS ON AN IMAGE PROCESSING APPARATUS, AND A COMPUTER-READABLE STORAGE MEDIUM FOR A PROGRAM TO BE EXECUTED BY AN IMAGE PROCESSING APPARATUS

This application is based on Japanese patent application No. 2014-222178 filed on Oct. 31, 2014, the contents of which are hereby incorporated by reference.

BACKGROUND OF THE INVENTION

Technical Field

The present invention relates to a technology for the use of cores of a multi-core CPU.

Background Art

Recent years have seen the widespread use of Central Processing Units (CPUs) each of which has a plurality of cores. Such a CPU is called a multi-core CPU.

The multi-core CPU causes the cores to execute programs different from one another. The multi-core CPU also distributes processes based on one program to the cores for execution.

Examples of an image forming apparatus using such a multi-core CPU include an image forming apparatus having the configuration as follows. The image forming apparatus is an image forming apparatus in which a drawing processing means performs drawing processing for each region of a page. The image forming apparatus includes: a print data storing means for storing print data; a drawing instruction generating means for analyzing the print data to generate drawing instruction data in which a drawing instruction of an object serving as a drawing object is described in each page; an optimization information creating means for analyzing the print data in parallel with the drawing instruction generating means to create optimization information for determining a region taken by the drawing processing means; an intermediate data storing means for storing the drawing instruction data and the optimization information; and the drawing processing means for determining the region to be taken based on the optimization information to perform drawing processing of the drawing instruction data for each region (Japanese Laid-open Patent Publication No. 2012-071544).

Further, heterogeneous CPUs with cores different in computing performance become popular. The number of products mounting a heterogeneous CPU thereon is expected to increase in the future.

Devices such as Multi-Functional Peripherals (MFPs) often perform processes in parallel. It is thus advantageous to mount a multi-core CPU onto an MFP.

As discussed above, there has been proposed the technology for using a homogeneous CPU efficiently. The technology, however, does not always increase the efficiency of the use of a heterogeneous CPU.

SUMMARY

One or more embodiments of the present invention use a heterogeneous CPU in an image processing apparatus more efficiently than what is conventionally possible.

An image processing apparatus according to one or more embodiments of the present invention includes a processor having a plurality of cores, each having different specifications. The image processing apparatus further includes a first estimator that estimates a processing capability of each of the plurality of cores, a second estimator that estimates, based on the processing capability of each of the plurality of cores, a required time for each of the plurality of cores to perform a specific process, and a controller. The plurality of cores includes one or more candidate cores. The required time for each of the one or more candidate cores is equal to or less than a threshold. The controller controls one of the one or more candidate cores to perform the specific process. The required time of the candidate core that perform the specific process is the longest among the one or more candidate cores.

One or more of embodiments of the image processing apparatus may include a third estimator that estimates a load required to perform the specific process; wherein the second estimator estimates the required time further based on the load.

In one or more embodiments of the image processing apparatus, the first estimator may estimate the processing capability of each of the plurality of cores based on the specifications of each of the plurality of cores. Alternatively, in one of more embodiments of the image processing apparatus, the first estimator may estimate the processing capability of each of the plurality of cores based on information gathered, at start-up of the subject image processing apparatus, from each of the plurality of cores.

One or more embodiments of the present invention will become more apparent by the following detailed description of embodiments with reference to drawings.

BRIEF DESCRIPTION OF THE DRAWINGS

FIG. 3 is a diagram showing an example of the functional configuration of an image processing apparatus.

DETAILED DESCRIPTION OF EMBODIMENTS

Figure 1:
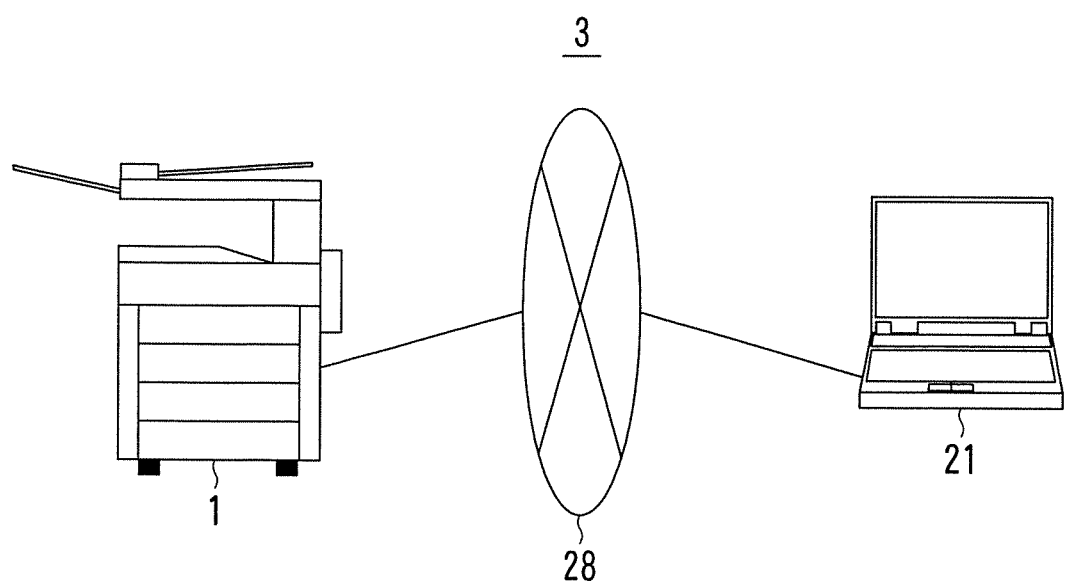
FIG. 1 is a diagram showing an example of the overall configuration of an image processing system.
Figure 2A:
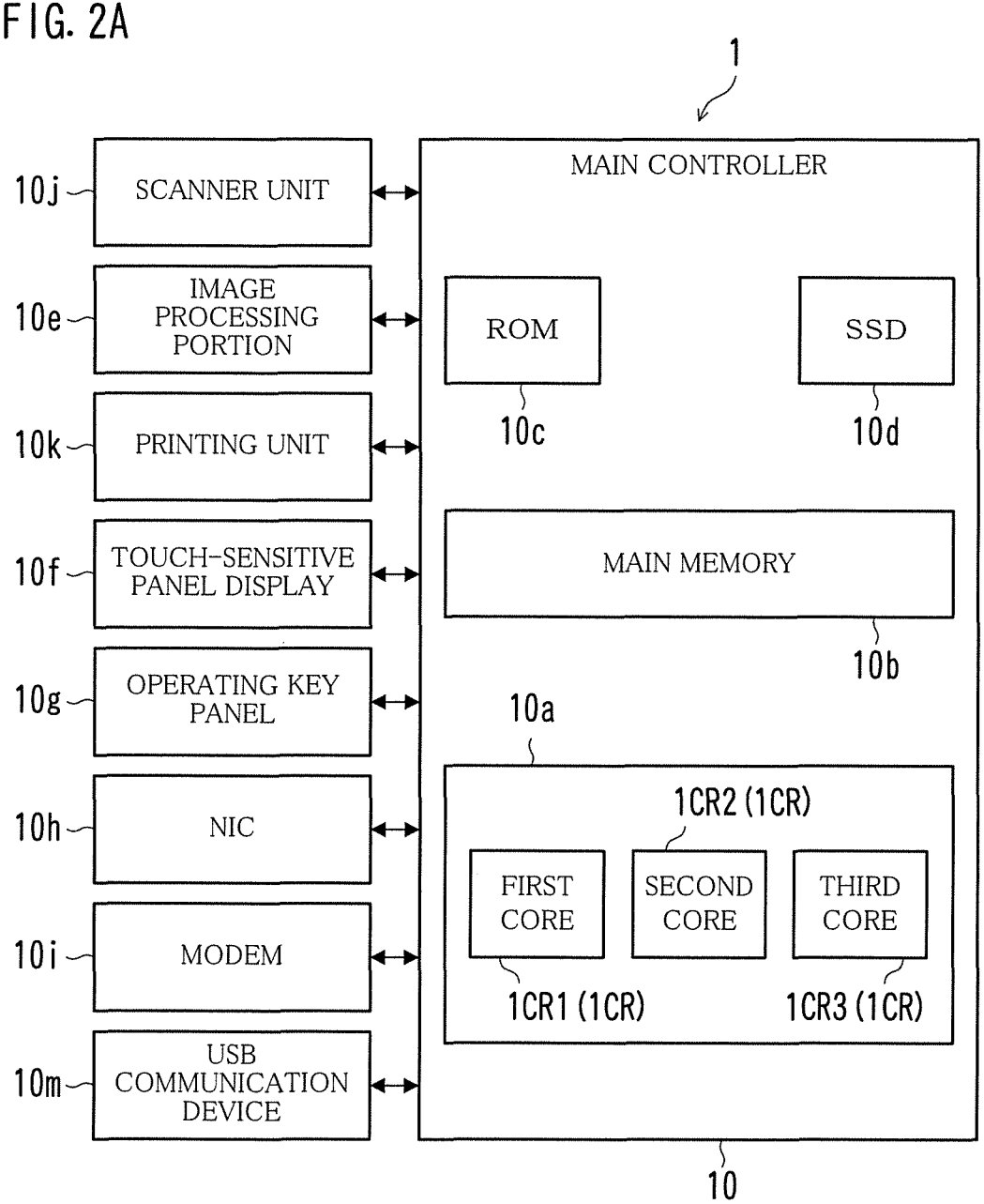
FIG. 2A is a diagram showing an example of the hardware configuration of an image processing apparatus.
Figure 2B:
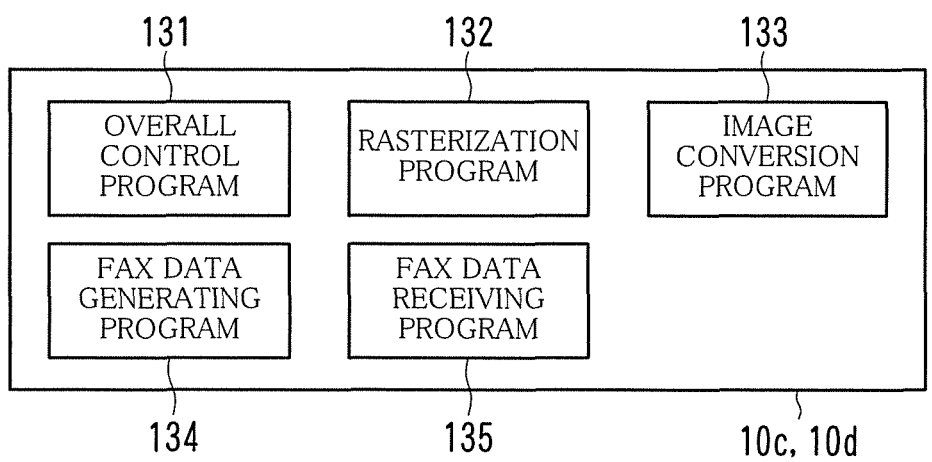
FIG. 2B is a diagram showing an example of programs installed on the image processing apparatus.
Figure 4:
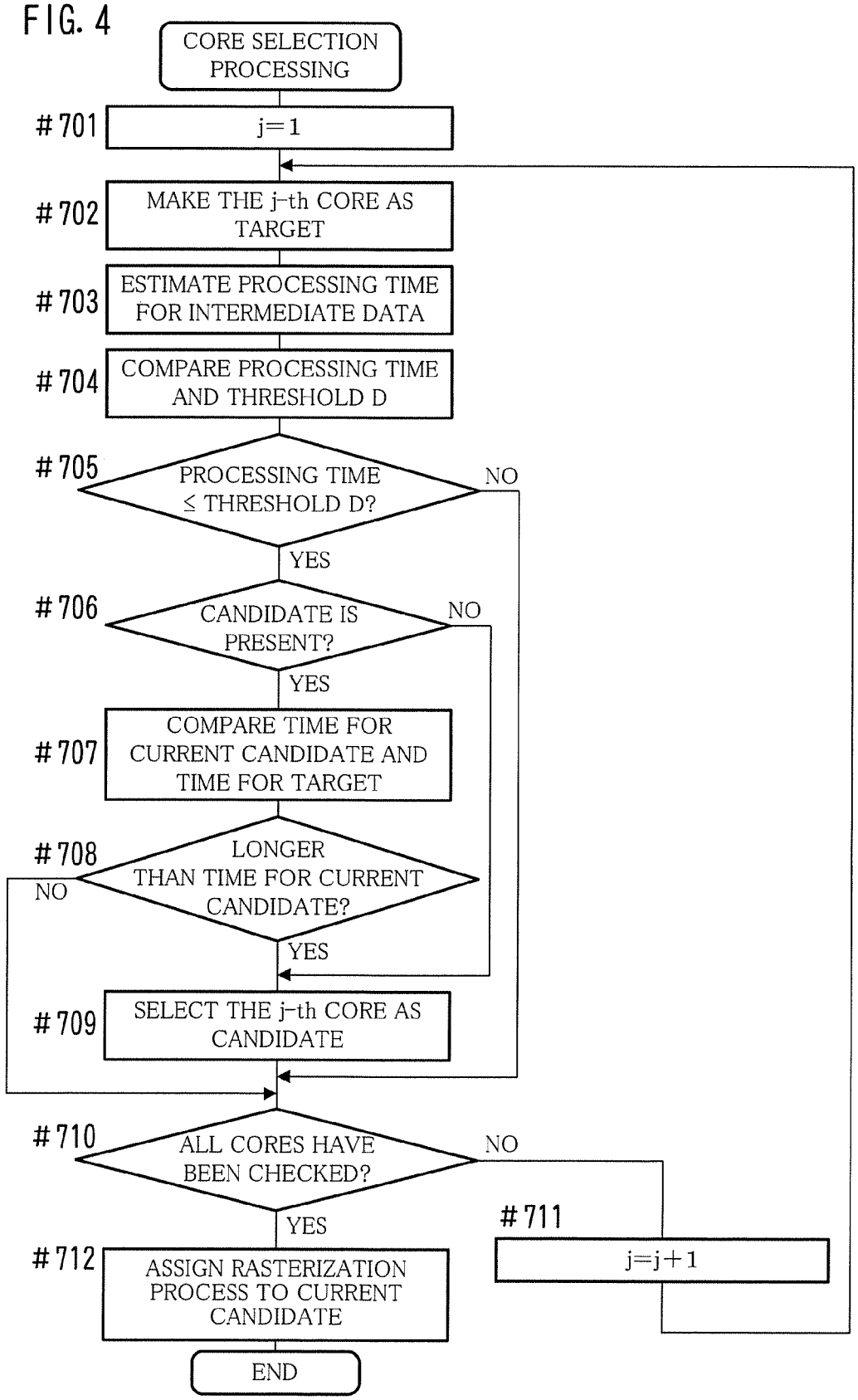
FIG. 4 is a flowchart depicting an example of the flow of core selection processing.

FIG. 1 is a diagram showing an example of the overall configuration of an image processing system 3. FIG. 2A is a diagram showing an example of the hardware configuration of an image processing apparatus 1; and FIG. 2B is a diagram showing an example of programs installed on the image processing apparatus 1. FIG. 3 is a diagram showing an example of the functional configuration of the image processing apparatus 1. FIG. 4 is a flowchart depicting an example of the flow of core selection processing.

The image processing system 3 is to execute different types of image-related processing. As shown in FIG. 1, the image processing system 3 is configured of the image processing apparatus 1, a terminal 21, a communication line 28, and so on.

The image processing apparatus 1 and the terminal 21 are capable of performing communication with each other via the communication line 28. Examples of the communication line 28 are a public line, a Local Area Network (LAN), the Internet, and a dedicated line.

The image processing apparatus 1 is an apparatus into which functions such as copying, PC printing, faxing, and scanning are combined. The image processing apparatus 1 is generally called an "image forming apparatus", a "multi-function device", or a "Multi-Functional Peripheral (MFP)".

The PC printing function is to print an image onto paper based on print data sent by the terminal 21. The print data is generally described in a Page Description Language (PDL).

Referring to FIG. 2A, the image processing apparatus 1 is configured of a main controller 10, an image processing portion 10e, a touch-sensitive panel display 10f, an operating key panel 10g, a Network Interface Card (NIC) 10h, a modem 10i, a scanner unit 10j, a printing unit 10k, a Universal Serial Bus (USB) communication device 10m, and so on.

The image processing portion 10e serves to apply different types of image processing to an inputted image or an image to be outputted.

The touch-sensitive panel display 10f serves to display, for example, a screen for presenting messages to a user, a screen for allowing the user to input commands or information, and a screen for showing the results of processing executed by the main controller 10. The touch-sensitive panel display 10f sends a signal indicating a touched location to the main controller 10.

The operating key panel log is a so-called hardware keyboard. The operating key panel log has numeric keys, a start key, a stop key, and a function key.

The NIC 10h sends and receives image data with the terminal 21 in accordance with a protocol such as Transmission Control Protocol/Internet Protocol (TCP/IP).

The modem 10i sends and receives fax data with a facsimile terminal in accordance with a protocol such as G3.

The scanner unit 10j optically reads an image recorded on a sheet placed on a platen glass.

The printing unit 10k prints, onto a sheet, the image captured by the scanner unit 10j. The printing unit 10k also prints, onto a sheet, an image based on data obtained by the NIC 10h or the modem 10i from other devices. The image is sometimes subjected to image processing by the image processing portion 10e.

The USB communication device 10m is connected to peripheral devices such as a USB memory or external hard disk drive via a USB cable to send and receive data with the peripheral devices.

The main controller 10 is configured of a Central Processing Unit (CPU) 10a, a main memory 10b, a Read Only Memory (ROM) 10c, a Solid State Drive (SSD) 10d, and so on.

The CPU 10a is a heterogeneous CPU. The CPU 10a has a plurality of cores (CPU cores) different in performance (specifications). In one or more embodiments, a CPU having three cores 1CR is used as the CPU 10a. Hereinafter, the cores 1CR may be stated by respectively differentiating them as a "first core 1CR1", a "second core 1CR2", and a "third core 1CR3".

The main memory 10b is a non-volatile memory, namely, a Random Access Memory (RAM). The main memory 10b is shared by the three cores 1CR.

Referring to FIG. 2B, the ROM 10c or the SSD 10d has installed therein programs, for example, an overall control program 131, a rasterization program 132, an image conversion program 133, a fax data generating program 134, and a fax data receiving program 135.

The overall control program 131 is to control an overall operation of the image processing apparatus 1. With the overall control program 131, for example, the order that jobs are executed is managed, and processing of individual steps of a job is assigned to the cores 1CR.

The rasterization program 132 is to rasterize intermediate language data.

The image conversion program 133 is to convert raw data (bitmap data of Red (R), Green (G), and Blue (B)) of the image captured by the scanner unit 10j into image data in a format for drawing software (Graphics Interchange Format (GIF), for example) or into image data in a format for document browsing (Portable Document Format (PDF), for example).

The fax data generating program 134 is to convert raw data (bitmap data of Red (R), Green (G), and Blue (B)) of the image captured by the scanner unit 10j into fax data in conformity with a facsimile protocol.

The fax data receiving program 135 is to convert fax data received by the modem 10i into bitmap data.

The programs are loaded to (expanded in) the RAM 10b. Then, the programs are executed by any of the cores 1CR.

The overall control program 131 runs when the image processing apparatus 1 is turned ON. The overall control program 131 is resident in the main memory 10b. The following description takes, as an example, the case where the first core 1CR1 executes the overall control program 131.

The overall control program 131 implements the functions of an initialization processing portion 101, an intermediate language data generating portion 102, a processing load estimator 103, a computing performance estimator 104, a core selection processing portion 105, and an execution instructing portion 106, all of which are shown in FIG. 3.

When the image processing apparatus 1 is turned ON, the initialization processing portion 101 performs processing for initialization (initial settings) of the image processing apparatus 1. The processing is, for example, to initialize the hardware and to start the driver of the image processing apparatus 1.

The intermediate language data generating portion 102 generates intermediate language data 52 for each page by analyzing print data 51 sent, for PC printing, from the terminal 21 and converting the print data 51 into an intermediate language.

Meanwhile, in order to print an image, it is necessary to generate bitmap data by performing a rasterization process on the intermediate language data 52. In one or more embodiments, the first core 1CR1 performs the rasterization process in some cases, and another core 1CR performs the rasterization process in other cases.

The processing load estimator 103, the computing performance estimator 104, and the core selection processing portion 105 perform processing for selecting a core 1CR which is to perform the rasterization process.

The processing load estimator 103 estimates, for each page, a load R required for the rasterization process to be applied to the intermediate language data 52.

In general, as the number of objects contained in an image is greater, the load is larger. As the number of dots of the object is greater, the load is larger. The load sometimes becomes larger depending on attributes of the object. Suppose that, for example, two objects overlap each other, and the upper object has transparency such as a transparent Graphics Interchange Format (GIF). In such a case, the load is large because the upper object and the lower object have to be blended together.

In view of this, the processing load estimator 103 calculates (estimates) a load R based on the following equation (1). Hereinafter, an object with transparency and an object without transparency are sometimes referred to as a "transparent object" and a "non-transparent object", respectively.

[Equation 1]

$$R_p = \sum_{k=1}^{Np} a_1 \cdot E_k + \sum_{i=1}^{Mp} a_2 \cdot F_i \quad (1)$$

wherein "Rp" represents a load R of the p-th page; "Np" represents the number of non-transparent objects with which no transparent objects overlap in the p-th page; "Ek" represents the number of dots of the k-th non-transparent object with which no transparent objects overlap in the p-th page; "Mp" represents the number of combinations of non-transparent objects and transparent objects overlapping with each other in the p-th page; "Fi" represents the sum of the number of dots of the non-transparent object and of the number of dots of the transparent object both of which make the i-th combination in the p-th page; and "a1" and "a2" are coefficients having the relationship "a1<a2".

The computing performance estimator 104 calculates (estimates) the computing performance (processing capability) of each of the three cores 1CR, for example, in the following method.

Information on specifications of each of the cores 1CR is prepared in advance in the form of table data. The information is, for example, a computing time taken to execute predetermined processing. The computing performance estimator 104 then calculates computing performance by substituting the information into a predetermined function. Alternatively, the computing performance estimator 104 may calculate the computing performance not only based on the information but on the current operational state of the cores 1CR. Suppose that, for example, the current operating ratio of the first core 1CR1 is L %. In that case, since the performance corresponding to L % is used for another process, the computing performance estimator 104 may calculate, as the computing performance of the first core 1CR1, performance obtained by deducting L % from the performance indicated in the table data.

Another configuration is also possible. When the image processing apparatus 1 starts up, or immediately before the computing performance is estimated, each of the cores 1CR is caused to perform predetermined processing, and the computing time by each of the cores 1CR is calculated. In this way, the computing performance may be estimated. Yet another configuration is possible. A bus bandwidth between the core 1CR and the main memory 10b, an amount of computation per unit time (i.e., computing throughput), and so on are calculated. The bus bandwidth and the computing throughput are substituted into the predetermined function. In this way, the computing performance may be estimated.

The following is a description of an example in which the computing performance is represented by using a time required to perform rasterization on intermediate language data of a normal image. The time is referred to as a "required time U".

The core selection processing portion 105 selects, for each page, a core 1CR which is to perform rasterization based on the results of estimation (computation) by the processing load estimator 103 and the computing performance estimator 104. How to select such a core 1CR is described with reference to FIG. 4. The description takes, as an example, a case of selecting a core 1CR for the first page.

The core selection processing portion 105 makes the first-order core 1CR (a first core 1CR1 in this example) as a target (Step #701 and Step #702). The core selection processing portion 105 estimates a time Tj taken for the first core 1CR1 to perform rasterization on the first page (a time T1 herein) (Step #703). The estimation may be made based on the following equation (2).

[Equation 2]

$$Tj = b \cdot Rp \cdot Uj \quad (2)$$

As described above, "Rp" represents a load R of the p-th page. The processing load estimator 103 calculates "Rp", and p=1 herein. "Uj" represents a required time U for the j-th core 1CR. The computing performance estimator 104 calculates "Uj", j=1 and "b" is a coefficient herein.

The core selection processing portion 105 compares the time Tj (the time T1 herein) with a threshold D (Step #704).

In the meantime, excessive time for rasterization does not allow the printing unit 10k (engine) to provide the functions well enough. To be specific, since the printing unit 10k has to wait for the completion of rasterization, the print speed of the printing unit 10k cannot be utilized. The threshold D represents a longest (maximum) time permitted to be taken for rasterization so that the printing unit 10k conducts printing at the highest print speed (or at a predetermined print speed) without waiting for the completion of rasterization on the next page. Stated differently, the threshold D represents, for the case of printing on a plurality of pages, a required time for rasterization which manages to keep the highest print speed (or the predetermined print speed) as a whole.

If the time T1 is equal to or less than the threshold D (YES in Step #705), and further, if a candidate to perform rasterization (hereinafter, referred to as a "candidate core") has already been selected (YES in Step #706), then the core selection processing portion 105 compares a time Tj for the candidate core and a time Tj for the target core 1CR (Step #707). However, at this point of time, only the first core 1CR1 is made as the target and no more candidate cores are present (NO in Step #706). Thus, the processing of Step #707 is bypassed. The core selection processing portion 105 then selects, as the candidate core, the target core 1CR, namely, the first core 1CR1 (Step #709).

On the other hand, if the time Tj is larger than the threshold D (NO in Step #705), then the core selection processing portion 105 does not select the target core 1CR (the first core 1CR1 herein) as the candidate core.

If there are cores 1CR which have not yet been made as the target (NO in Step #710), then the core selection processing portion 105 selects, from among the cores 1CR, a next core 1CR which has not yet been made as the target (Step #711 and Step #702). The description goes on to the processing by the core selection processing portion 105 by taking an example in which the first core 1CR1 is selected as the candidate core and a second core 1CR2 is made as a new target.

The core selection processing portion 105 estimates (Step #703) a time Tj (a time T2 herein) also for the second core 1CR2 in the foregoing manner, and compares the time T2 with the threshold D (Step #704).

If the time T2 is equal to or less than the threshold D (YES in Step #705), then the core selection processing portion 105 compares the time T2 with the time T1 (Step #707). This is because there is a candidate core (the first core 1CR1 herein)

(YES in Step #706). If a time Tj for the target core 1CR is longer than a time Tj for the candidate core, specifically, if the time T2 is longer than the time T1 (YES in Step #708), then the core selection processing portion 105 omits the current candidate core, and selects the target core 1CR, namely, the second core 1CR2, as a new candidate core (Step #709). This changes the candidate core from the first core 1CR1 to the second core 1CR2. On the other hand, if the time Tj for the target core 1CR is equal to or shorter than the time Tj for the candidate core, specifically, if the time T2 is equal to or shorter than the time T1 (NO in Step #708), then the core selection processing portion 105 bypasses the processing of Step #709. Consequently, the candidate core is the first core 1CR1, meaning that the candidate core remains unchanged.

The core selection processing portion 105 bypasses the processing of Step #709 also when the time T2 is larger than the threshold D (NO in Step #705). The candidate core is thus the first core 1CR1, meaning that the candidate core remains unchanged.

The core selection processing portion 105 makes each of the cores 1CR as a target. The core selection processing portion 105 then selects, as a core 1CR which is to perform rasterization on the first page, the core 1CR which is the candidate core at the time of the completion of the processing of Step #703 through Step #709. (Step #712).

In short, according to the processing shown in FIG. 4, the core selection processing portion 105 selects, as the core to perform rasterization on the first page, a core 1CR which satisfies the following two conditions:
(Condition A): The time Tj is equal to or less than the threshold D.
(Condition B): Among cores 1CR satisfying Condition A, a core 1CR having the longest time Tj.

As for the second page and onward, the core selection processing portion 105 selects a core 1CR in a manner similar to the foregoing manner.

The execution instructing portion 106 instructs the core 1CR selected by the core selection processing portion 105 to perform rasterization. At this time, the execution instructing portion 106 gives the selected core 1CR the intermediate language data 52 on a page to be subjected to the rasterization. For example, when the third core 1CR3 is selected as a core 1CR which is to perform rasterization on the third page, the execution instructing portion 106 instructs the third core 1CR3 to perform rasterization and gives the third core 1CR3 the intermediate language data 52 on the third page.

When being given the instructions and the data, the core 1CR rasterizes the data based on the rasterization program 132 to generate bitmap data. The bitmap data is used to cause the printing unit 10k to carry out printing. The print command to the printing unit 10k may be given by the core 1CR which has performed the rasterization, or, alternatively, by a core 1CR which executes the overall control program 131 (the first core 1CR1 in this example).

However, when the core selection processing portion 105 selects the first core 1CR1 of that core selection processing portion 105, the first core 1CR1 performs rasterization based on the rasterization program 132.

In this way, the processing load estimator 103, the computing performance estimator 104, and the core selection processing portion 105 select a core 1CR which is to perform a rasterization process. The processing load estimator 103, the computing performance estimator 104, and the core selection processing portion 105 may select a core 1CR which is to perform processing other than the rasterization. The basic principle thereof in such a case is the same as discussed above. Points differing from the foregoing method are mainly provided below.

The processing load estimator 103 estimates (calculates) a load R required for the processing, for example, in the following manner.

For execution of processing for converting raw data of images captured, by the scanner unit 10j, from one sheet or each of sheets into GIF image data or PDF image data, the processing load estimator 103 estimates, for each page (each face) of paper, a load R required for the conversion.

For execution of processing for sending, via facsimile, images captured, by the scanner unit 10j, from one sheet or each of sheets, the processing load estimator 103 estimates a load R required for processing of converting the raw data captured by the scanner unit 10j into fax data.

For execution of processing for converting image data (fax data) received by the modem 10i into bitmap data, the processing load estimator 103 estimates, for each page, a load R required for the conversion.

Functions or tables used to calculate the load R are prepared, in advance, depending on algorithms of the processing of the three cases. The processing load estimator 103 estimates a load R by using the functions or tables instead of using the foregoing equation (1).

The computing performance estimator 104 estimates the computing performance of each of the cores 1CR as with the case of rasterization. The computing performance estimator 104 may estimate the performance depending on processing to be executed by the selected core 1CR. Stated differently, the computing performance estimator 104 may estimate a time taken for the processing to be performed on data of a regular image.

As with the case of rasterization, the core selection processing portion 105 selects a core 1CR which is to execute processing based on the results of estimation (computation) by the processing load estimator 103 and the computing performance estimator 104. Note that the coefficient b in the equation (2) is preset depending on the processing type and so on. The same is similarly applied to the threshold D. As described earlier, the threshold D is so preset that the speed of a device outputting an image or data thereof is utilized. Such a device is, for example, the printing unit 10k, the NIC 10h, and the modem 10i.

Figure 5:
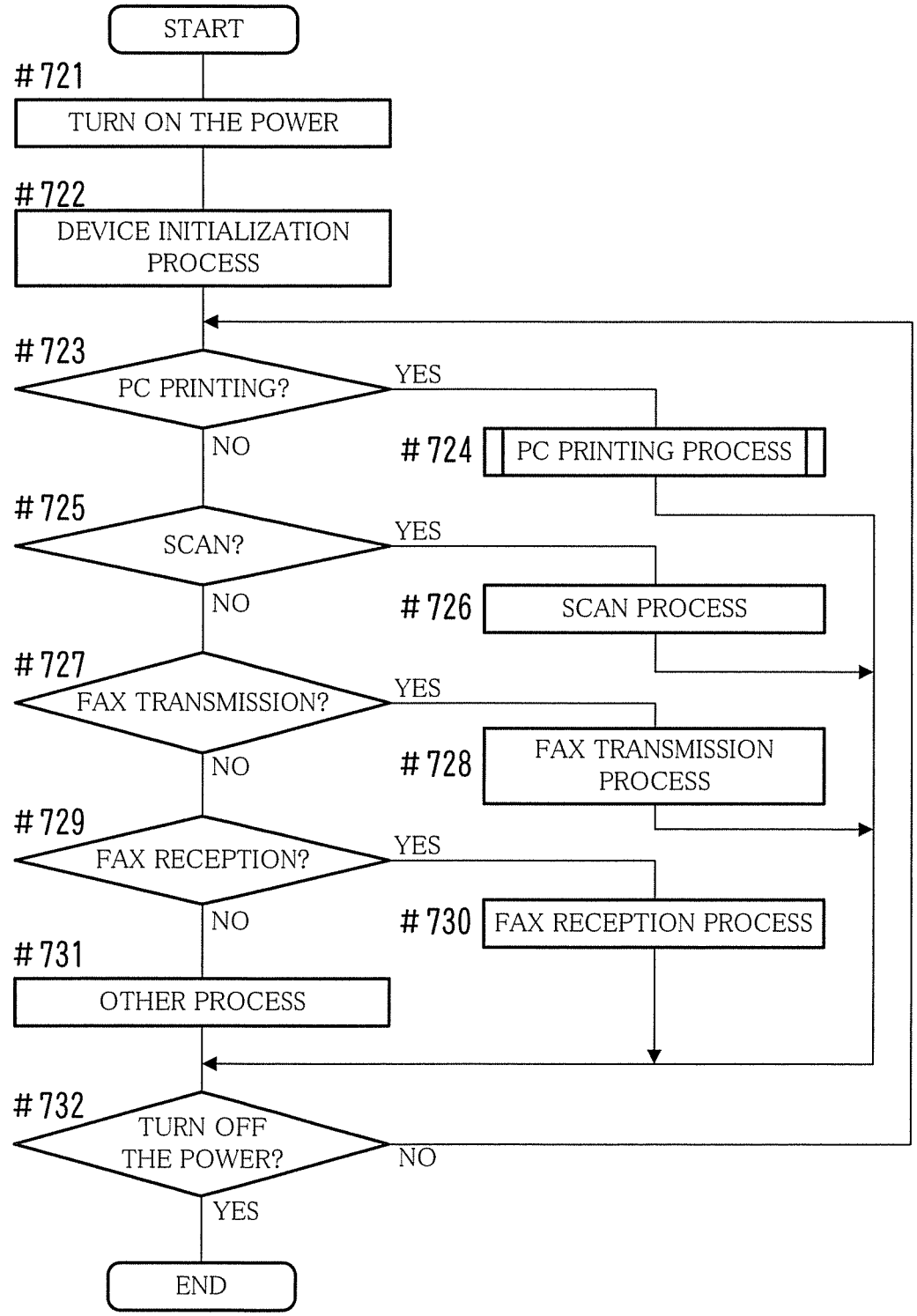
FIG. 5 is a flowchart depicting an example of the flow of the entire processing by an image processing apparatus.
Figure 6:
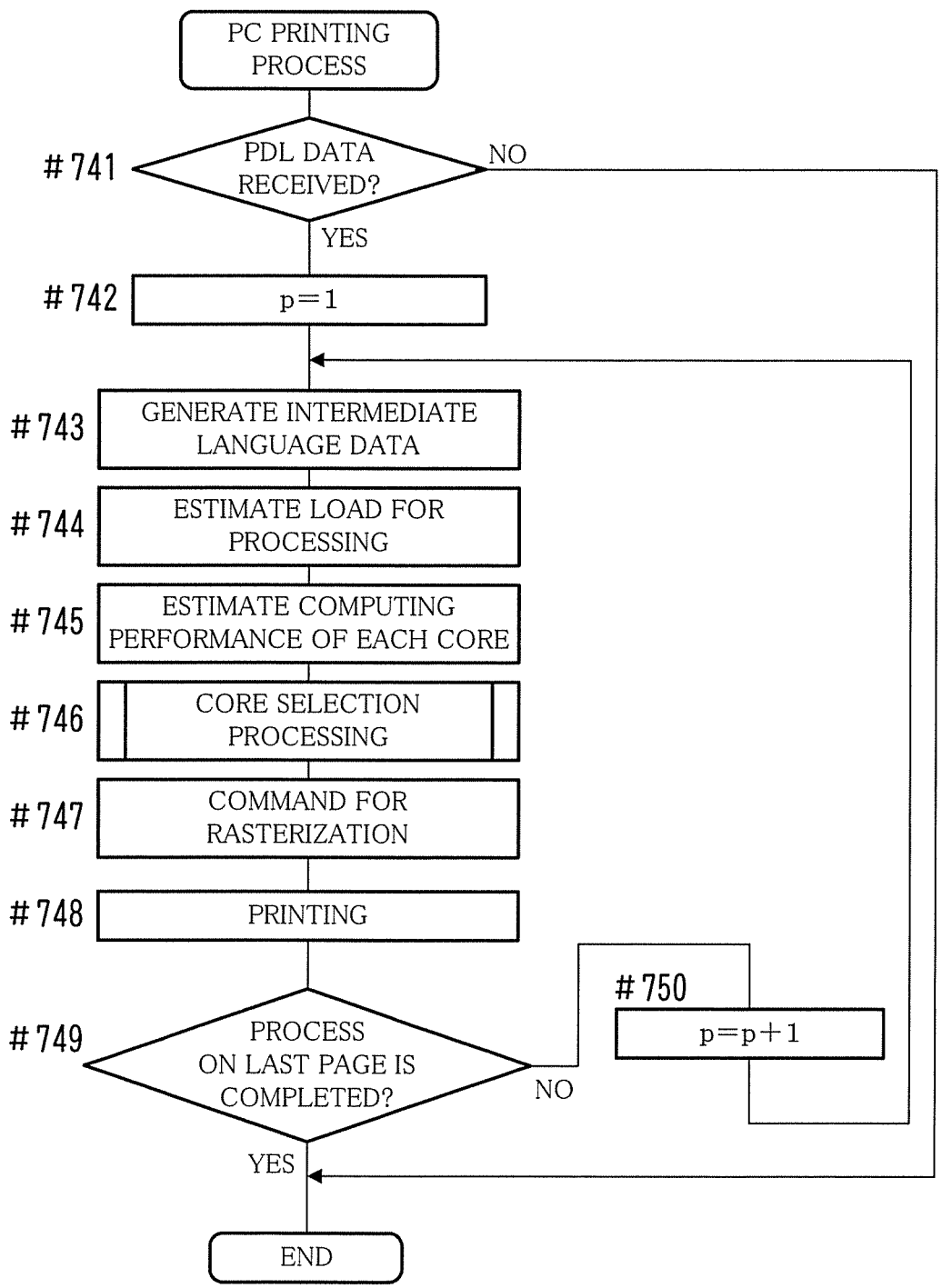
FIG. 6 is a flowchart depicting an example of the flow of PC print processing.

FIG. 5 is a flowchart depicting an example of the flow of the entire processing by the image processing apparatus 1. FIG. 6 is a flowchart depicting an example of the flow of PC print processing.

The description goes on to the flow of the entire processing by the overall control program 131 with reference to the flowcharts of FIGS. 5 and 6. The description takes an example in which the first core 1CR1 executes the overall control program 131.

When the image processing apparatus 1 is turned ON (Step #721 of FIG. 5), the overall control program 131 is loaded into the main memory 10b. The first core 1CR1 executes processing of Step #722 and onward based on the overall control program 131.

The first core 1CR1 performs initial settings such as initialization of the hardware and start-up of the driver (Step #722). Every time a command or data is entered externally, the first core 1CR1 performs processing as follows.

When print data 51 (image data in PDL) is sent from the terminal 21 for PC printing (YES in Step #723), the first core 1CR1 executes PC printing (Step #724). The PC printing is performed in the manner as shown in FIG. 6.

When receiving the print data 51 successfully (YES in Step #741 of FIG. 6), the first core 1CR1 generates intermediate language data 52 for the first page (Step #742 and Step #743), and calculates (estimates) a load R (Step #744) required in order to perform a rasterization process on the intermediate language data 52. The first core 1CR1 further calculates (estimates) the computing performance of each of the cores 1CR (Step #745).

The first core 1CR1 selects a core 1CR which is to perform a rasterization process on the first page in accordance with the results of processing of Step #744 and Step #745 (Step #746). How to select such a core 1CR is the same as discussed above with reference to FIG. 4.

The first core 1CR1 instructs the selected core 1CR to perform a rasterization process (Step #747). At this time, the first core 1CR1 gives the selected core 1CR the intermediate language data 52 on the first page. However, if the first core 1CR1 itself is selected in Step #746, then the first core 1CR1 performs the rasterization program 132 to perform rasterization.

The first core 1CR1 controls the printing unit 10k to conduct printing by using the bitmap data obtained through the rasterization process (Step #748). It is also possible that the selected core 1CR controls the printing unit 10k.

The first core 1CR1 performs the processing on the second page and beyond similarly to that on the first page (NO in Step #749, Step #750, and Step #743 through Step #748). If the processing is completely performed on the last page (YES in Step #749), then the first core 1CR1 finishes the print processing.

Referring back to FIG. 5, when the scanner unit 10j optically reads an image in response to a scan command given by the user (YES in Step #725), the first core 1CR1 controls the individual portions in the following manner to execute processing for saving image data on the image (Step #726).

The first core 1CR1 selects a core 1CR which is to execute processing for converting raw data obtained by the scanner unit 10j into image data in a predetermined format. The first core 1CR1 causes the selected core 1CR to execute the processing. The first core 1CR1 then controls the NIC 10h or the USB communication device 10m, for example, in such a manner that the image data obtained is transferred or saved to a predetermined saving location or a saving location designated by the user. To be specific, when the saving location is another device, the first core 1CR1 controls the NIC 10h to transfer the image data to such another device. Alternatively, when the saving location is a recording medium such as a USB memory, the first core 1CR1 controls the USB communication device 10m to save the image data into the recording medium. Another arrangement is also possible in which the first core 1CR1 controls the NIC 10h or the USB communication device 10m to transfer or save the image data on a page-by-page basis. The processing is executed based on the image conversion program 133.

When the scanner unit 10j optically reads an image in response to a fax transmission command given by the user (YES in Step #727), the first core 1CR1 controls individual portions in the following manner to send the image via facsimile (Step #728).

The first core 1CR1 selects a core 1CR which is to execute processing for converting the raw data obtained by the scanner unit 10j into data in a facsimile format (fax data). The first core 1CR1 causes the selected core 1CR to execute the processing. The first core 1CR1 controls the modem 10i in such a manner that the obtained fax data is sent to a device corresponding to a facsimile number designated by the user. The processing is executed based on the fax data generating program 134.

If the modem 10i receives the fax data (YES in Step #729), then the first core 1CR1 controls the individual portions in such a manner that an image is printed out based on the fax data (Step #730).

The first core 1CR1 selects a core 1CR which is to execute processing for converting the fax data into bitmap data. The first core 1CR1 causes the selected core 1CR to execute the processing. The first core 1CR1 controls the printing unit 10k in such a manner that printing is carried out based on the obtained bitmap data. The processing is carried out based on the fax data receiving program 135.

Further, the first core 1CR1 appropriately executes necessary processing based on a command given by the user or external data (Step #731).

In Steps #726, #728, #730, and #731, from among the cores 1CR capable of utilizing the performance of output hardware, a core 1CR having the lowest specifications is selected.

The first core 1CR1 executes the foregoing processing appropriately until the image processing apparatus 1 is turned off (NO in Step #732, and Step #723-Step #731).

In one or more embodiments, from among the cores 1CR, a core 1CR which utilizes the performance of an output device (the NIC 10h, the modem 10i, or the printing unit 10k) and has the lowest specifications is selected. The core 1CR selected is caused to execute a specific process. It is therefore possible to use the CPU 10a which is a heterogeneous CPU in the image processing apparatus 1 more efficiently than is conventionally possible.

One or more embodiments of the present invention use a multi-core processor of the three cores 1CR, as the CPU 10a. The number of the cores 1CR is not limited to three. The CPU 10a may be a multi-core processor of, for example, two, four, six, or eight cores.

In some cases, no core 1CR is present which utilizes the performance of the printing unit 10k, the NIC 10h, or the modem 10i. For example, in selecting a core 1CR which is to perform a rasterization process, sometimes no core 1CR is found which satisfies Condition A. In such a case, the core selection processing portion 105 selects a core 1CR having the highest specifications. Alternatively, the core selection processing portion 105 may select the core 1CR which is calculated (estimated) by the computing performance estimator 104 and has the highest specifications at this point.

If there are cores 1CR which are the same in performance, then the core selection processing portion 105 selects, from among the cores 1CR, a core 1CR in which the number of programs currently running is the smallest.

Alternatively, the core selection processing portion 105 may exclude, from the beginning, the core 1CR where a program is currently running from candidate cores. In such a case, the core selection processing portion 105 may select a core 1CR which is to execute processing from among cores 1CR where no programs are currently running.

Yet alternatively, in the case where a plurality of cores 1CR is capable of performing parallel processing, the computing performance estimator 104 estimates the computing performance of each core 1CR, or, of each combination (group) of cores 1CR, and, the core selection processing portion 105 selects a combination of cores 1CR having the lowest performance from among combinations of cores 1CR satisfying the predetermined condition (for example, Condition A for the case of rasterization). The execution instructing portion 106 causes the selected combination of cores 1CR to execute processing.

Thus, for the case of "n" cores 1CR, the computing performance estimator 104 calculates (estimates) the computing performance (processing capability) of $(2^n-1)$ combinations.

While there are a wide variety of methods for calculating computing performance, it may be preferable in some cases to use a method similar to the method for calculating the computing performance of one core 1CR. To be specific, information on specifications of each combination of cores 1CR may be prepared as the table data in advance. The computing performance may be calculated by substituting the information into a predetermined function. Another arrangement is also possible. On start-up of the image processing apparatus 1, or immediately before the estimation of computing performance, each combination of cores 1CR is caused to perform predetermined processing. The computing performance may be calculated by timing the computation.

In particular, for the use of three cores 1CR or more, the foregoing method is used favorably in which the computing performance is estimated for each core or each combination of cores 1CR to execute a specific process.

In one or more embodiments, the overall control program 131 is used to generate the intermediate language data 52 from the print data 51. Stated differently, the overall control program 131 implements the intermediate language data generating portion 102. Instead of this, however, the intermediate language data generating portion 102 may be implemented based on another program (intermediate language data generating program).

In such a case, the processing load estimator 103 estimates a load required for processing of generating the intermediate language data 52. The core selection processing portion 105 selects a core 1CR which is to generate the intermediate language data 52 based on the load estimated and the computing performance of each core 1CR (or of each combination of cores 1CR). Then, the selected core 1CR (or the selected combination of cores 1CR) is caused to execute the intermediate language data generation program. Thereby, the intermediate language data 52 is generated from the print data 51.

In one or more embodiments, the processing load estimator 103 calculates the load R based on the equation (1). Instead of this, however, the load R may be calculated based on another equation.

In one or more embodiments, the load R is calculated (estimated) based on the equation (1), and the time T is calculated (estimated) by substituting the load R into the equation (2). Instead of this, it is also possible to combine the equation (1) and the equation (2) together, and to calculate the time T based on the combined equation.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image processing apparatus comprising:
a processor comprising a plurality of cores that share an internal Random Access Memory (RAM) of the processor, wherein each of the plurality of cores is different in computing performance;
a first estimator that estimates a processing capability of each of the plurality of cores;
a second estimator that estimates, based on the processing capability of each of the plurality of cores, a required time for each of the plurality of cores to perform a specific process executable by the plurality of cores;
a third estimator that estimates a load required to perform the specific process; and
a controller, wherein
the plurality of cores comprises one or more candidate cores,
the required time for each of the one or more candidate cores is equal to or less than a threshold,
the controller controls one of the one or more candidate cores to perform the specific process,
the required time of the candidate core that performs the specific process is the longest among the one or more candidate cores,
the second estimator estimates the required time based on the load, and
the load is an amount of resources required for the plurality of cores to perform the specific process.

2. The image processing apparatus according to claim 1, wherein the first estimator estimates the processing capability of each of the plurality of cores based on the specifications of each of the plurality of cores.

3. The image processing apparatus according to claim 1, wherein the first estimator estimates the processing capability of each of the plurality of cores based on information gathered, at start-up of the subject image processing apparatus, from each of the plurality of cores.

4. The image processing apparatus according to claim 1, wherein the specific process is any of a process for converting data described in Page Description Language (PDL) into intermediate language data, a process for performing rasterization on the intermediate language data, and a process for converting data read by a scanner into bitmap data, and the threshold is set such that a printer conducts printing at a constant speed based on data obtained through steps including the specific process.

5. The image processing apparatus according to claim 1, wherein the specific process converts data read by a scanner into application data for application, and the threshold is set such that the application data is saved to a recording medium at a constant speed.

6. An image processing apparatus comprising:
a processor comprising a plurality of cores that share an internal Random Access Memory (RAM) of the processor, wherein each of the plurality of cores is different in computing performance, wherein the plurality of cores perform a specific process in a plurality of groups;
a first estimator that estimates a processing capability of each of the plurality of groups;
a second estimator that estimates, based on the processing capability of each of the plurality of groups, a required time for each of the plurality of groups to perform the specific process executable by the plurality of cores;
a third estimator that estimates a load required to perform the specific process; and
a controller, wherein
the plurality of groups comprises one or more candidate groups,
the required time for each of the one or more candidate groups is equal to or less than a threshold,
the controller controls one of the one or more candidate groups to perform the specific process, the required time of the candidate group that performs the specific process is the longest among the one or more candidate groups, the second estimator estimates the required time based on the load, and the load is an amount of resources required for the plurality of cores to perform the specific process.

7. A method comprising:

performing a specific process executable by a plurality of cores that share a Random Access Memory (RAM) with an image processing apparatus, the image processing apparatus comprising a processor comprising the plurality of cores, each different in computing performance, and the plurality of cores comprising one or more candidate cores, wherein the performing step comprises:

estimating a processing capability of each of the plurality of cores;

estimating, based on the processing capability of each of the plurality of cores, a required time for each of the plurality of cores to perform the specific process estimating a load required to perform the specific process; and controlling one of the one or more candidate cores to perform the specific process, wherein the required time for each of the one or more candidate cores is equal to or less than a threshold, the required time of the candidate core that performs the specific process is the longest among the one or more candidate cores, the second estimator estimates the required time based on the load, the RAM shared by the plurality of cores is an internal RAM of the processor, and the load is an amount of resources required for the plurality of cores to perform the specific process.

8. A non-transitory computer-readable storage medium storing thereon a computer program used in a processor, the processor being provided in an image processing apparatus and comprising a plurality of cores that share a Random Access Memory (RAM), wherein each of the plurality of cores is different in computing performance, and the plurality of cores comprising one or more candidate cores, the computer program causing the processor to perform processing comprising:

estimating a processing capability of each of the plurality of cores that are different in computing performance;

estimating, based on the processing capability of each of the plurality of cores, a required time for each of the plurality of cores to perform a specific process executable by the plurality of cores;

estimating a load required to perform the specific process; and selecting one of the one or more candidate cores as a core that performs the specific process, wherein the required time for each of the one or more candidate cores is equal to or less than a threshold, the required time of the core that performs the specific process is the longest among the one or more candidate cores, the second estimator estimates the required time based on the load, the RAM shared by the plurality of cores is an internal RAM of the processor, and the load is an amount of resources required for the plurality of cores to perform the specific process.

* * * * *